No. 747,488. PATENTED DEC. 22, 1903.
T. ROOKE & J. THRUSH.
GARBAGE DESTRUCTOR.
APPLICATION FILED APR. 22, 1903.
NO MODEL. 3 SHEETS—SHEET 1.
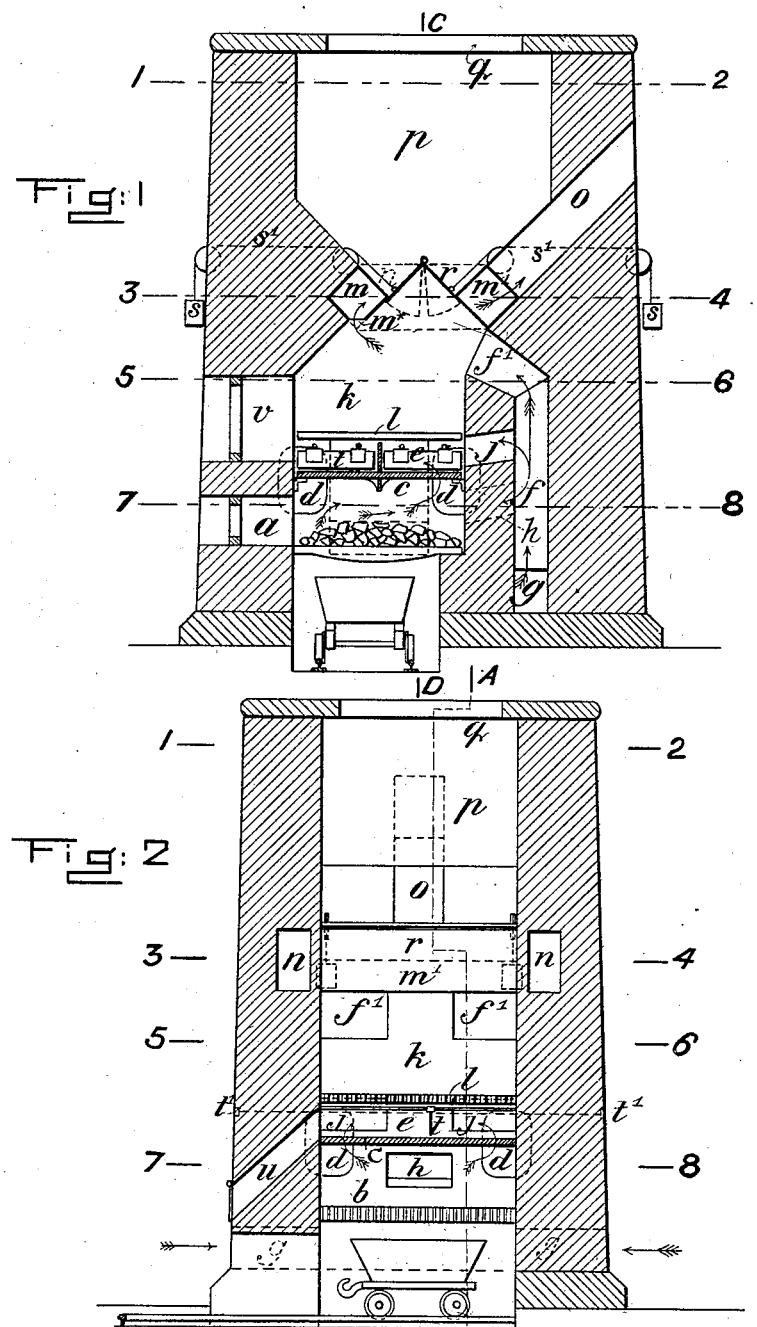

No. 747,488. PATENTED DEC. 22, 1903.
T. ROOKE & J. THRUSH.
GARBAGE DESTRUCTOR.
APPLICATION FILED APR. 22, 1903.
NO MODEL. 3 SHEETS—SHEET 2.
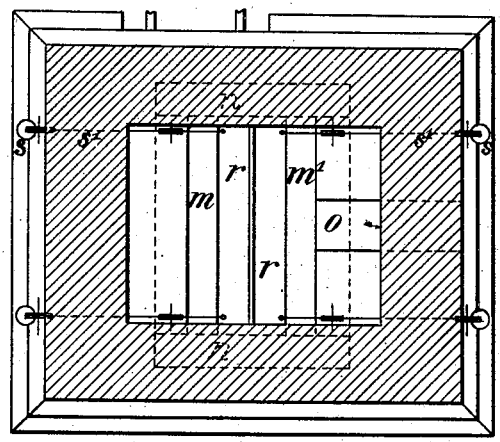
Fig: 3
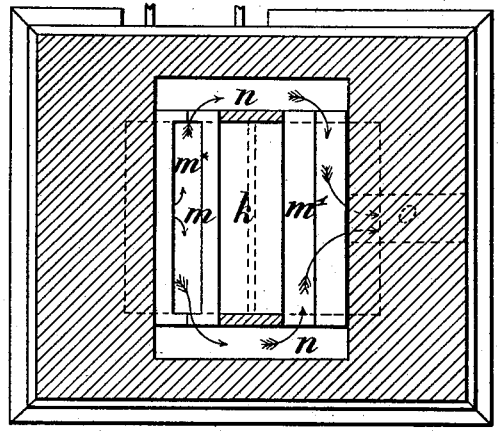
Fig: 4
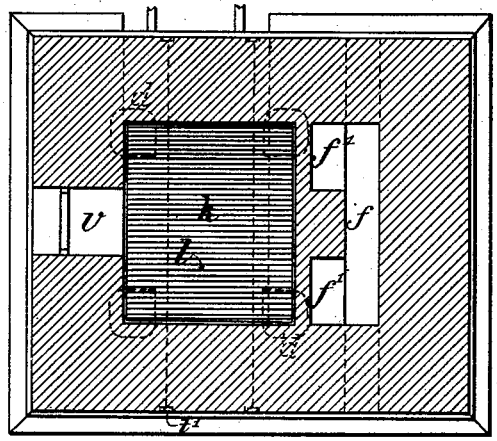
Fig: 5
WITNESSES
H. M. Kuehne
John A. Percival
INVENTORS
Thomas Rooke
John Thrush
BY Richardson
ATTORNEYS No. 747,488. PATENTED DEC. 22, 1903.
T. ROOKE & J. THRUSH.
GARBAGE DESTRUCTOR.
APPLICATION FILED APR. 22, 1903.
NO MODEL. 3 SHEETS—SHEET 3.

WITNESSES
H. M. Kuehne
John A. Percival

INVENTORS
Thomas Rooke
John Thrush
BY
ATTORNEYS

No. 747,488. Patented December 22, 1903.

UNITED STATES PATENT OFFICE.

THOMAS ROOKE, OF NEWTOWN, AND JOHN THRUSH, OF DULWICH HILL, NEW SOUTH WALES, AUSTRALIA.

GARBAGE-DESTRUCTOR.

SPECIFICATION forming part of Letters Patent No. 747,488, dated December 22, 1903.

Application filed April 22, 1903. Serial No. 153,867. (No model.)

*To all whom it may concern:*

Be it known that we, THOMAS ROOKE, a resident of Enmore road, Newtown, and JOHN THRUSH, a resident of Silver Hill, New Canterbury road, Dulwich Hill, in the State of New South Wales, Commonwealth of Australia, subjects of the King of Great Britain and Ireland, have invented a certain new and useful Garbage-Destructor, of which the following is a specification.

The essential features of novelty in this invention are the combination, with a fire-space or furnace, of a roasting-plate, above which is a screen or grating which overlies the furnace, but underlies the hopper where the garbage is tipped. There is also a special arrangment of flues whereby hot air is mixed with the products of combustion from the fuel and with the mixed gases from the garbage in order to secure the maximum of heat, and therefore the maximum of destructive combustion.

In order that the invention may be properly understood, reference is made to the accompanying sheets of drawings, in which—

Figure 6:
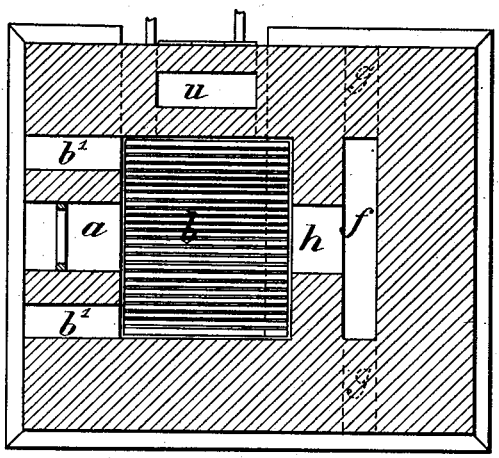
Figure 7:
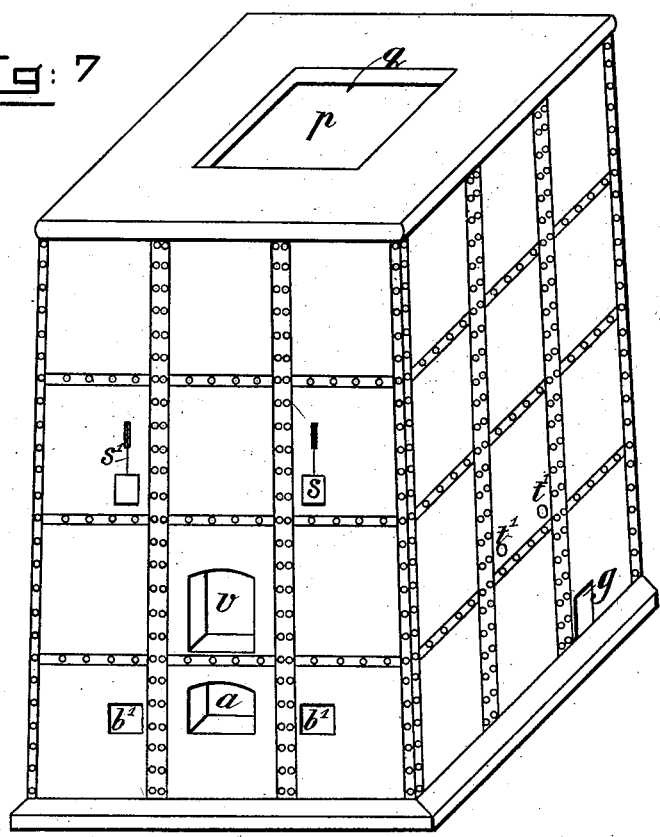

Figure 1 is a vertical section of a complete cell, taken on the line A B of Fig. 2. Fig. 2 is a vertical section of the same in a plane at right angles to Fig. 1 and on the line C D of Fig. 1. Fig. 3 is a horizontal section on the line 1 2 of Figs. 1 and 2. Fig. 4 is a horizontal section on the line 3 4 of Figs. 1 and 2. Fig. 5 is a horizontal section on the line 5 6 of Figs. 1 and 2. Fig. 6 is a horizontal section on the line 7 8 of Figs. 1 and 2. Fig. 7 is an isometrical projection of the exterior of the cell.

Although only one cell has been shown in the drawings, it may be premised that cells may be worked in pairs or in nests of pairs and that a steam generator or boiler may be placed in any suitable position relative to the cells whereby the waste products of combustion may be utilized for the purpose of raising steam.

The cell is inclosed in a casing composed of angle and T iron, which form a framework of panels, the panels being filled in with buckled plates and backed by concrete, fire-brick, or fire-clay lining in any suitable manner, so that the greatest efficiency may be obtained and radiation of the heat minimized. The external view is shown at Fig. 7. A door $a$ is made in the front of the casing to afford admission to the fire-space or furnace $b$, which is of ordinary boiler construction. Above the fire-space $b$ is a roasting-plate $c$, that is cut away at the corners to afford flue-spaces $d$ for the passage of the products of combustion from the fire-space. This flue and spaces $d$ are increased in size by halving the same into the surrounding brickwork, and thus they form direct connections for the admission of the products of combustion from the fire-space $b$ to the space $e$ above the roasting-plate $c$. Immediately behind the fire-space $b$ and space $e$ is an air-chamber $f$, which is open to the external atmosphere through the air passages or flues $g$. The products of combustion besides partly passing through the flue-spaces $d$ in the plate $c$ will also partly pass through the flue-passage $h$ at the rear of the fire-space $b$ into the air-chamber $f$, mixing there with the hot air which has entered through the passages $g$ and will then partly pass through the flue-passages $j$ $j$ into the space $e$ and will partly pass upward through flue-passages $f'$ $f'$ into the garbage chamber or cell $k$ above the screen or grating $l$. An additional volume of air may be introduced into the fire-space $b$ through the air-openings $b'$ $b'$, which are specially shown in the horizontal section Fig. 6 and external view Fig. 7.

The products of combustion from the furnace and the mixed gases from the garbage will escape from the garbage chamber or cell $k$ through the square flues $m$ $m'$, which almost surround the dome of the garbage chamber or cell $k$. The disposition of these flues is clearly shown in the horizontal section Fig. 4. The lower angle of the square flue $m$, which lies nearest to the front of the furnace, is cut away, so as to make a rectangular opening $m^*$, through which the smoke and mixed gases in the chamber or cell $k$ may enter the flue $m$. The front flue $m$ is connected to the back flue $m'$ by lateral flue-passages $n$ $n$, made in the brickwork and specially shown in the horizontal section Fig. 4. From the rear square flue $m'$ the smoke and gases will pass through the uptake-flue O away from the cell.

Above the chamber or cell $k$ and the square flues $m\ m'$ is the garbage-hopper $p$, into which the garbage is tipped from above through the opening $q$. The bottom of the hopper $p$ is closed and cut off from the garbage chamber or cell $k$ by the swinging doors $r\ r$, which open inward or downward. These doors $r$ are caused to open by the weight of the garbage which lies upon them, pressing them downward, and are caused to close by the reacting force of the counterweights $s\ s$ and chains $s'\ s'$. It will thus be seen that any garbage which may come in contact with the swinging doors $r\ r$, square flues $m\ m'$, and uptake-flue $o$ will be thoroughly dried before it can enter the garbage chamber or cell $k$.

The mode of operation is as follows: The garbage is tipped into the hopper $p$ from above. As soon as the weight of garbage is sufficient the doors $r\ r$ will open downward, the garbage will slide into the garbage chamber or cell $k$ and will lie upon the screen or grating $l$, the dust and smaller stuff dropping through the grating $l$ onto the roasting-plate $c$, while the larger stuff will remain upon the grading $l$ to be consumed. It is obvious that the roasting-plate $c$ will become choked by the accumulation of dust upon it. In order to prevent this result, swinging scrapers $t$ are provided. These scrapers are worked backward and forward by rods or chains $t'\ t'$ from the outside of the cell, a chute $u$ being provided down which the dust can escape from the cell when it is raked over by the scrapers $t$. By referring to Fig. 1, it will be seen that the roasting-plate $c$ is directly heated by the furnace-fire beneath it. The space $e$, above $c$ and below $l$, is heated by the products of combustion entering the space partly through the corner-flues $d$ and partly through the passages $h\ f\ j$, while the larger garbage, which lies upon the grating $l$, will be heated from below by the heat from the space $e$ and from above by the heat from the furnace, which travels from the fire-space $b$ through the passages $h\ f\ f'$. The noxious gases and products of combustion will be drawn off from the garbage chamber or cell $k$ through the flues and passages $m\ n\ n\ m'$ into the uptake $o$. The combustion of the garbage will be greatly accelerated and intensified by the hot air in the chamber $f$, the air becoming highly heated before it can enter the garbage chamber or cell $k$. What indestructible residue remains after the cremation of the garbage is complete will be withdrawn from the garbage chamber or cell $k$ through the door $v$. (Shown in Figs. 1, 5, and 7.)

Having now described our invention, what we claim as new, and desire to secure by Letters Patent, is—

1. In garbage-destructors, a garbage-chamber, a hopper above the chamber, a fire-space, a roasting-plate above the same, a grating above the roasting-plate, said grating forming the bottom of the garbage-chamber, and air-passages leading from the fire-space to the space between the roasting-plate and the said grate, said passages being arranged at the corners of the roasting-plate, a vertical air-chamber $f$, a flue-passage $h$ leading thereto from the fire-space and a flue-passage $j$ leading from the air-chamber to the space between the roasting-plate and the grating, substantially as described.

2. In garbage-destructors, a garbage-chamber, a hopper above the chamber, a fire-space, a roasting-plate above the fire-space, a grating above the roasting-plate forming the bottom of the said chamber, a passage leading from the fire-space, an air-chamber $f$ with which said passage connects said fire-space communicating with the external atmosphere, and passages leading from the fire-space to the space between the roasting-plate and the grate and also from the said air-chamber to the said space between the roasting-plate and grate.

3. In garbage-destructors, a fire-space, a roasting-plate above the fire-space, a grating a little distance above the roasting-plate, passages for conveying the products of combustion from the fire-space to the space above the roasting-plate, an air-chamber behind the fire-space, such chamber being in open communication with the external atmosphere, passages or flues for allowing the products of combustion from the fire-space to enter the air-chamber, and flues or passages from the air-chamber to the space between the roasting-plate and the overlying grating, and flues or passages from the air-chamber to the garbage chamber or cell above the grating, as herein specified.

4. In garbage-destructors, a fire-space, a roasting-plate above the fire-space, a grating a short distance above the roasting-plate, a garbage chamber or cell above the grating, a garbage-hopper above the garbage chamber or cell, doors closing the bottom of said hopper, means controlling said doors, an air-chamber behind the fire-space, and passages connecting the air-chamber with the fire-space and the space above the roasting-plate and also with the garbage-chamber.

5. In garbage-destructors, a fire-space, a roasting-plate above the fire-space, a grating above the roasting-plate, a garbage-cell above the grating, an air-space behind the fire-space, suitable flues or passages for conveying the products of combustion to the air-chamber and from thence to the garbage-spaces, an uptake-flue between the garbage-cell and the hopper, such flue being in communication on one side with the garbage-cell and on the other with the uptake-flue, as herein specified.

In witness whereof we have hereunto set our hands in the presence of two witnesses.

THOMAS ROOKE.
JOHN THRUSH.

Witnesses:
MANFIELD NEWTON,
A. R. W. MASSEY.